United States Patent Office 3,679,386
Patented July 25, 1972

3,679,386
PROCESS AND APPARATUS FOR FORMING A METAL OXIDE COATING ON FLAT GLASS
Akira Kushihashi, Nishinomiya-shi, and Koji Ikeda, Tsushi, Japan, assignors to Nippon Sheet Glass Co., Ltd., Osaka, Japan
Filed June 22, 1970, Ser. No. 48,334
Claims priority, application Japan, June 30, 1969, 44/52,058
Int. Cl. C03c 17/20
U.S. Cl. 65—60
8 Claims

ABSTRACT OF THE DISCLOSURE

Process and apparatus for forming a metal oxide coating on the surface of flat glass wherein a solution of a metal compound convertible to its oxide upon pyrolysis is sprayed from a nozzle uniformly on the surface of flat glass maintained at a temperature of 400° to 750° C. during its transfer towards a lehr, the spraying being performed within a spray chamber including the nozzle therein and defined by partition walls in order not to have the spray scattered in the direction of transfer of the flat glass. The process ensures the formation of a uniform and compact coating.

---

This invention relates to a process and an apparatus for forming a metal oxide coating on flat glass, and more specifically, to a process and an apparatus for use in the continuous production of flat glass and being suitable for continuously forming a thin metal oxide coating on the surface of a ribbon glass in the neighborhood of an inlet of a lehr or in the lehr while the ribbon glass is being transferred to the lehr after formation.

The term "flat glass," used in the present specification and claims, is meant to include both ribbon glass formed continuously from molten glass and being still uncut, and a sheet glass obtained by cutting the ribbon glass to a suitable size. It is known that coating of a thin film of a metal oxide on the surface of flat glass is practised for the purpose of producing a transparent flat glass having the ability to reflect thermic rays, or of producing a transparent flat glass colored in various colors imparted by the coating, or for other purposes. The conventional method of forming a metal oxide coating on the surface of flat glass involves either (1) heating flat glass cut to a predetermined size and having a cleansed surface to a temperature above about 500°C. and spraying a solution of a metal compound on the surface thereby to pyrolyze said compound by the heat of the glass or (2) dipping the flat glass in a solution of the metal compound to coat the surface of the flat glass with a solution of the metal compound, and heating the coated glass to pyrolyze said metal compound. According to such a conventional methods, a solution of a metal compound is difficult to coat uniformly on large flat glass, resulting in a non-uniform thickness of the coating or non-uniformity of color. In the conventional method, glass sheet formed at high temperatures and annealed during its production is again subjected to heating in the formation of an oxide coating. Therefore, unless the glass sheet coated, with a metal oxide is re-annealed after reheating, thermal stress remains in the glass plate, making it impossible to cut it to the desired sizes. Re-annealing of flat glass having an oxide coating formed thereon, however, requires a huge equipment or a very long operating time in simple equipment. Both are very costly, and are thus not commercially practical. Accordingly, it is usual in the abovementioned prior art method that the glass sheet be cut to the desired sizes before formation of a metal oxide coating.

On the other hand, it is known to form an enamel or metal layer on as-formed figured glass by spraying a coating material by means of a flame jet device. This method, however, results in a non-uniform thickness and a poor compactness involving such defects as nonuniform parts and color non-uniformity perceptible to the naked eye, and is not applicable to the production of a transparent flat glass. Generally, transparent glass having the ability to reflect thermic rays or colored transparent glass is required to have a metal oxide coating of uniform thickness and quality and of compactness. But according to the conventional methods, it has been considerably difficult to form a metal oxide coating which satisfies these conditions on flat glass of relatively large size, especially ribbon glass produced continuously.

An object of the present invention is to provide a novel process and an apparatus for adhering a uniform and compact metal oxide coating firmly to a flat glass having a relatively large area, especially a glass ribbon formed continuously from molten glass.

The present invention provides a process for forming a metal oxide coating on the surface of flat glass, which comprises transferring flat glass maintained at a high temperature towards a lehr, spraying from a nozzle a solution of a metal compound convertible to its oxide on pyrolysis uniformly on the surface of the flat glass at a point where the temperature of the advancing flat glass is at a temperature of 400 to 750° C., thereby to form a coating of the metal oxide on the surface of the flat glass, confining the applied spray of the said metal compound solution within a spray chamber including said nozzle therein and defined by partition walls so as not to scatter said spray in the direction of transferring said flat glass, removing a waste gas of the spray from said spray chamber, and continuously advancing the flat glass so coated with the metal oxide through the lehr.

In order to practise the process of the present invention, the invention provides an apparatus for forming a metal oxide coating on the surface of flat glass, comprising a lehr for annealing flat glass maintained at a high temperature, means for advancing said flat glass toward and through said lehr, at least one spray gun disposed closely facing the surface of said flat glass and at a position where the temperature of the advancing flat glass is 400° to 750° C., a nozzle secured to the top end of said spray gun for spraying a solution of a metal compound onto the surface of the flat glass, means for feeding said metal compound solution to said spray gun and jetting out said metal compound solution from the nozzle at the top end of the spray gun, partition walls forming together with part of the flat glass a spray chamber extending in a direction transverse to the advancing direction of said flat glass and including said spray gun and said nozzle therein to confine a spray of said metal compound solution, and exhaust means within said spray chamber including suction holes disposed near the surface of the flat glass to which said metal compound solution is sprayed and adapted to suck and remove spray waste gas from the spray chamber through said suction holes.

The invention will be described in greater detail with reference to the accompanying drawings in which.

Figure 1:
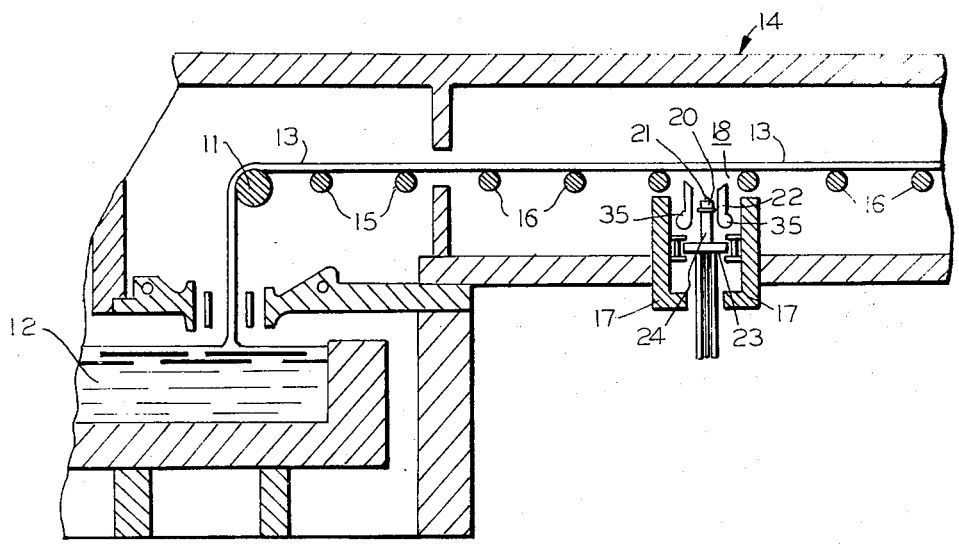
FIG. 1 is a side elevation in vertical section, showing one embodiment of the apparatus of the present invention.

In the process of the present invention, the most preferred mode is to spray a solution of a metal compound on the surface of a ribbon glass as-formed from molten glass which is clean and has high activity (namely, readily permitting adhesion of a metal oxide), and to pyrolyze the metal compound on the surface of the ribbon glass to convert it to its oxide the method of producing a transparent ribbon glass having the ability to reflect thermic rays in accordance with this mode of practice will be described in detail with reference with FIG. 1.

Referring to FIG. 1, molten glass 12 is lifted in a perpendicular direction by means of a bending roll 11, turns horizontally, and is formed into a ribbon glass 13. The ribbon glass 13 is successively transferred toward a lehr 14 by means of machine rolls 15, and further advanced at a predetermined rate through the lehr by means of a number of conveyor rolls 16 provided within the lehr 14. The ribbon glass 13 formed in a predetermined thickness is gradually cooled during passage through the lehr. At any optional point where the ribbon glass 13 in the lehr has a temperature within the range of about 400° C. to about 750° C. (for instance, at a point near about 550° C. in the embodiment shown in FIG. 1), a spray gun 20 is disposed beneath the ribbon glass. The lower limit of the temperature range specified above is defined as about 400° C., which is the lowest temperature at which the metal compound can be decomposed on the flat glass with relative ease. On the other hand, the upper limit of this temperature range is defined as about 750° C., which is the highest temperature at which flat glass is relatively free from deformation during transfer thereof. A nozzle 21 is secured to the top end of the spray gun 20, spaced by a suitable distance from the under surface of the ribbon glass 13 and facing the under surface. The spray gun 20 reciprocates in parallel with the surface of the ribbon glass 13 and in a direction at right angles to the advancing direction of the glass.

Figure 2:
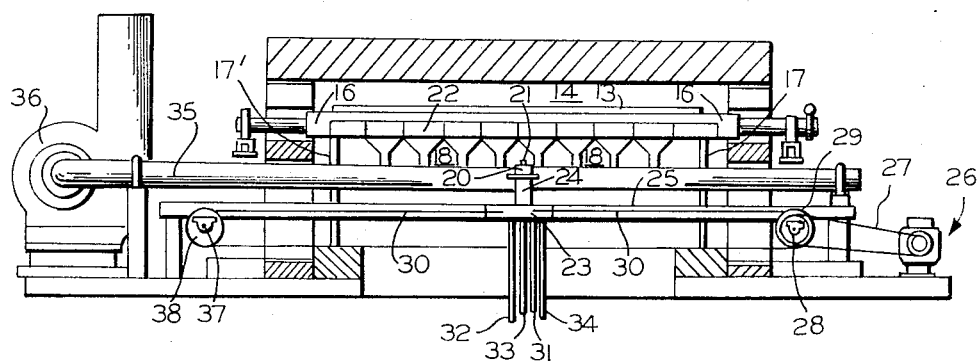
FIG. 2 is a front elevation in vertical section showing one embodiment of the spray chamber which constitutes a principal part of the apparatus of the present invention.
Figure 3:
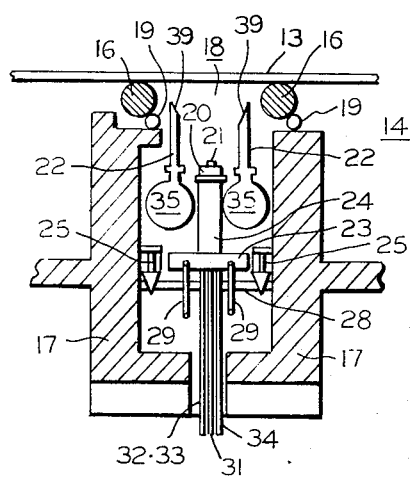
FIG. 3 is a side elevation in vertical section of the spray chamber shown in FIG. 2.

The reciprocating movement of the spray gun can be effected by any conventional means, and one example is shown in FIGS. 2 and 3. Referring to FIGS. 2 and 3, the spray gun 20 is secured to a vehicle 23 through a supporting member 24. The vehicle 23 is engaged with a pair of rails 25 provided in the widthwise direction of the lehr 14, and both ends of the vehicle 23 are connected with both ends, respectively, of a pair of wires 30. The pair of wires 30 run up between a pair of wheels 29 mounted to a rotary shaft 28 and a pair of wheels 38 fixed to a rotary shaft 37 located on the opposite side of the shaft 28. The rotary shaft 28 is driven through a belt 27 by a motor 26 which is rotated in normal and reverse directions by a limit switch (not shown) provided in the vicinity of both ends of the rail 25. Because of the construction described above, the vehicle 23 secured to the spray gun 20 moves in a widthwise direction of the ribbon glass by the rotation of the motor 26. When the spray gun reaches a predetermined position on the side of the ribbon glass, the motor 26 is rotated in the reverse direction by the actuation of the limit switch, and the vehicle 23 moves in an opposite direction. When the spray gun comes to a predetermined position on the opposite side, the vehicle 23 moving in the reverse direction is again moved in the normal direction by the actuation of the limit switch in accordance with the same mechanism as mentioned above. In this way, the vehicle 23 reciprocates between two predetermined positions in a widthwise direction of the ribbon glass 13.

To the spray gun is connected a pipe 31 for feeding a solution of a metal compound convertible to its oxide on pyrolysis to the nozzle 21 from a tank (not shown) through the spray gun 20, a feed pipe 32 and a drain pipe 33 for water which cools the spray gun to prevent the pyrolysis of the metal compound solution within the nozzle 21, and a pipe 34 for feeding compressed air for jetting out the metal compound solution to the nozzle 21 through the spray gun 20. Each of these pipes 31, 32, 33 and 34 is a flexible pipe. The pipe 32, pipe 33, and 34 are connected respectively to a water feed opening (not shown), a drain opening (not shown), and a compressor (not shown).

In accordance with the above-described construction, the vehicle 23 repeatedly reciprocates in the widthwise direction of ribbon glass 13, and a solution of a metal compound is continuously sprayed uniformly on the under surface of the advancing ribbon glass from the nozzle 21 of the spray gun 20 which cooperates with the vehicle 23. In one preferred embodiment of the process of present invention, the suitable number of reciprocal movements of the spray gun, namely of the vehicle, is 10 times per minute if the rate of advance of the ribbon glass 13 is for instance, one meter per minute.

In the manufacture of a transparent flat glass having a metal oxide coating capable of reflecting thermic rays, for instance, a solution of a metal compound consisting of 2.5% by weight of cobalt acetylacetonate, 2.5% by weight of chromium acetylacetonate, 2.25% by weight of iron acetylacetonate, 0.5% by weight of titanium acetylacetonate and 92.25% by weight of benzene as a solvent is fed to the nozzle 21 through the supply pipe 31.

A pair of partition walls 17 extending in a direction transverse to the lehr 14 are provided immediately beneath a pair of adjoining conveyor rolls to enclose the spray gun 20 therebetween. Both ends of the partition walls 17 are joined to another pair of partition walls 17'. Thus, the four partition walls 17, 17, 17', 17' form a closed rectangular peripheral wall. The closed peripheral wall has a bottom surface with a slot necessary for the reciprocal movement of the vehicle 23. Thus, a substantially closed chamber 18 is formed by the peripheral wall, the bottom surface, the under surface of flat glass facing the bottom surface of the peripheral wall, and the pair of the conveyor rolls described above. The chamber 18 includes the spray gun 20 and the nozzle 21, so that a sprayed matter (may be called mist hereinafter) of a metal compound solution sprayed against the undersurface of ribbon glass from the nozzle is confined within this chamber 18. In the present specification and claims, the chamber is referred to as spray chamber. With the conventional apparatus devoid of such spray chamber, a solution of a metal compound from the nozzle, when sprayed against the undersurface of ribbon glass, is very readily scattered on an air current. This results in the adhesion of a mist of the metal compound solution to undesired parts of flat glass and causes the non-uniform thickness of a metal oxide coating on the surface of the flat glass. Furthermore, a decomposition product of the scattered mist of the metal compound solution adheres to the surface of flat glass, or the decomposition product which has adhered to transfer rolls again adheres to flat glass, thereby causing haze or irregularity of colour of flat glass.

In the present invention, a substantially closed spray chamber of the type described above is provided in order to remove these defects of the prior art, and the mist of the sprayed metal compound solution is confined within the spray chamber 18 to prevent the scattering of the mist in a direction of transfer of glass ribbon 13. The provision of such a spray chamber is one of the novel and superior features of the present invention.

Needless to say, the lengths of the partition walls 17 extending in a direction transverse to the lehr 14 should be determined correspondingly to predetermined positions between which the spray gun reciprocates. When the range of the reciprocal movement of the spray gun is substantially equal to the width of flat glass, the side walls of the lehr may serve to replace the pair of partition walls 17' extending parallel with the transfer direction of the flat glass. In the embodiment illustrated in FIG. 3, a pair of rods 19 made of glass wool are provided on the top ends of the partition walls 17 to elevate the air-tightness of the chamber 18 by sealing a space between the top ends of the partition walls 17 and the conveyor rolls facing the respective partition walls.

A pair of draft cones 22 extending along the widthwise direction of the lehr are provided within the spray chamber 18 with the spray gun 20 therebetween. The top ends of the draft cones 22 form suction holes 39 located in the neighborhood of the under surface of glass ribbon 13 and opening toward the under surface of the glass. The bottom ends of the draft cones 22 are connected respectively to ducts 35 which are joined to an exhaustion device 36.

As previously stated, a sprayed matter, namely mist, of a solution of a metal compound is confined within the spray chamber 18. A part of the mist filled in the spray chamber adheres to the under surface of the glass ribbon 13, and the metal compound is pyrolyzed by the high temperatures of the ribbon glass and bound with oxygen in the atmosphere thereby to form a coating of a metal oxide on the surface of flat glass. At the time of pyrolysis, a decomposition gas and undesired decomposition products are formed. These products fill in the spray chamber 18 together with air jetted out from the spray nozzle 21. In the present specification and claims, the decomposition gas and undesired decomposition products occuring during the pyrolysis and the air fed from the compressor and jetted out from the nozzle 21 are inclusively termed "spray waste gas."

One feature of the process of the present invention is to suck and remove the spray waste gas filling the spray chamber 18 by the action of the exhaustion device 36 by way of the suction holes 39 of the draft cones 22 and through the air ducts 35. Since the spray waste gas is incessantly sucked and removed from the chamber in the manner mentioned above, the effective concentration in the spray chamber 18 of a mist of the metal compound solution jetted out from the nozzle 21 is increased, and the adhesion of the mist to the under surface of the ribbon glass 13 and its pyrolysis are accelerated. Furthermore, the adverse effect of contaminating the under surface of the as-formed glass by the waste gas is greatly reduced, and advantageously, a metal oxide coating formed on the under surface of ribbon glass becomes very compact and adheres to the glass with an improved strength.

As described above, glass ribbon having formed thereon a metal oxide coating is annealed while being transferred through the lehr 14 by the conveyor rolls 16.

Special description has been made hereinbefore with respect to an embodiment wherein a solution of a metal compound is sprayed on the surface of ribbon glass as-formed from molten glass which has high activity, and the sprayed metal compound is pyrolyzed on the surface of the ribbon glass. This process has the advantage that glass having a firm and compact coating of the metal oxide is obtained without pre-treating the glass, and that the coated flat glass can be cut into desired sizes after cooling because the flat glass is annealed during passage through the lehr even after spraying the metal compound solution at a temperature above 400° C. Therefore, coated glass which can be cut into optional sizes can be produced at low cost without using any special lehr.

Glass sheet obtained by cutting the glass so produced into the desired size has a uniform coat thickness, and no haze nor non-uniformity of color is observed. The glass sheet has an average light transmittance of 52%, and a ratio of reflection of solar energy of 30%. When the glass sheet was subjected to Weather-O-Meter, no change was observed after a lapse of 2000 hours. It is presumed that this glass sheet will withstand outdoor exposure for more than 7 years.

In the embodiment described above, the position of the spray gun 20 is within the lehr 14. It is not always necessary however that the spray gun 20 be situated inside the lehr. The only requirement as to the position is that the spray gun 20 should be positioned at a point closely facing that part of the flat glass which has a temperature of about 400 to about 750° C. Hence, the spray gun 20 may be provided forward of the lehr 14.

It is preferable to apply the process of the invention to the under surface, rather than the upper surface, of ribbon glass formed continuously in a horizontal direction by the "Colburn" process, float process, and rolled process because in such an application, an air current near the ribbon glass does not disturb pattern of the spray. The process of the invention is also applicable to a glass ribbon produced continuously in a vertical direction by such a method as the "Fourcault" process and "Pittsburgh" process. Furthermore, both surfaces of glass ribbon may be coated in accordance with the process of the present invention.

In the embodiment described above, the invention is practised by one spray gun which reciprocates along the whole width of glass ribbon. But one or a plurality of spray guns which swing in a widthwise direction of the glass ribbon or a plurality of spray guns arranged in the widthwise direction of glass ribbon may also be used in the practice of the process of the invention.

The process of the invention is also applicable to the case where instead of a glass ribbon, a glass sheet of approporiate size is transferred to the lehr for re-annealing.

Examples of the metal compounds that are preferred in the process of the invention include acetylacetonate complex salts of cobalt, iron, chromium, nickel, tin, titanium, manganese, calcium and magnesium, cyclopentadienyl compounds of these metals, dubutyl tin diacetate, dimethyl tin dipropionate, and titanic acid ester. In order to prepare a solution of these metal compounds, any solvents which dissolve said metal salts can be used, and usually, methanol, benzene and toluene are employed.

What we claim is.

1. A process for forming a metal oxide coating on the surface of flat glass, which comprises transferring flat glass maintained at a high temperature towards a lehr, spraying from at least one nozzle a solution of a metal compound convertible to its oxide on pyrolysis uniformity on the surface of the flat glass at a point where the temperature of the advancing flat glass is at a temperature of 400 to 750° C., thereby to form a coating of the metal oxide on the surface of the flat glass, confining the applied spray of the said compound solution within a spray chamber including said nozzle therein and defined by partition walls, thereby preventing said spray from scattering in the direction of advancement of said flat glass, removing by suction the waste gas of the spray from the neighborhood of said flat glass surface in said spray chamber, and continuously advancing the flat glass so coated with said metal oxide through said lehr.

2. A process of claim 1 wherein said flat glass is a ribbon glass formed continuously from molten glass.

3. A process of claim 1 wherein the spraying of said metal compound solution is effected within said lehr.

4. An apparatus for forming a metal oxide coating on the surface of flat glass, comprising a lehr for annealing flat glass maintained at a high temperature, means for advancing said flat glass toward and through said lehr, at least one spray gun disposed closely facing the surface of said flat glass and at a position where the temperature of the advancing flat glass is 400° to 750° C., a nozzle secured to the top end of said spray gun for spraying a solution of a metal compound onto the surface of the flat glass, means for feeding said metal compound solution to said spray gun and jetting out said solution from the nozzle at the top end of the spray gun, partition walls forming together with part of the flat glass a spray chamber extending in a direction transverse to the advancing direction of said flat glass and including said spray gun and said nozzle therein to confine a spray of said metal compound solution, and exhaust means within said spray chamber including suction holes disposed near the surface of the flat glass to which said metal compound solution is sprayed and adapted to suck and remove spray waste gas from the spray chamber through said suction holes.

5. An apparatus of claim 4 wherein said spray chamber is positioned in said lehr.

6. An apparatus of claim 4 wherein mutually facing upper ends of said partition walls are located on both sides of the spray gun and immediately beneath a pair of adjoining conveyor rolls.

7. An apparatus of claim 6 wherein a pair of rods made of glass wool are provided on the upper ends of the partition walls so as to seal a space between the upper ends of said partition walls and the opposing conveyor rolls.

8. An apparatus of claim 4, further comprising means for causing said at least one spray gun to make a reciprocal movement in parallel with said flat glass and in a direction transverse to the advancing direction of said flat glass.

References Cited

UNITED STATES PATENTS

| | | | |
|---|---|---|---|
| 3,505,051 | 4/1970 | Buckley et al. | 65—60 |
| 3,438,803 | 4/1969 | Dubble et al. | 117—106 |
| 3,502,454 | 3/1970 | Shonebarger | 65—60 X |

ARTHUR D. KELLOGG, Primary Examiner

U.S. Cl. X.R.

65—194, 268; 117—102 L, 105.3, 107.2; 118—49, 325